US008824423B2

United States Patent
Hsu

(10) Patent No.: US 8,824,423 B2
(45) Date of Patent: Sep. 2, 2014

(54) METHOD AND APPARATUS FOR IMPROVING A HYBRID AUTOMATIC REPEAT REQUEST PROCEDURE IN THE TRANSITION OF TRANSMISSION TIME INTERVAL BUNDLING IN A WIRELESS COMMUNICATION SYSTEM

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 950 days.

(21) Appl. No.: 12/634,674

(22) Filed: Dec. 9, 2009

(65) Prior Publication Data

US 2010/0142494 A1 Jun. 10, 2010

Related U.S. Application Data

(60) Provisional application No. 61/121,191, filed on Dec. 10, 2008.

(51) Int. Cl.
 *H04J 3/00* (2006.01)
 *H04L 12/43* (2006.01)
 *H04L 1/18* (2006.01)

(52) U.S. Cl.
 CPC .............. *H04L 1/189* (2013.01); *H01L 1/1812* (2013.01); *H04L 1/1887* (2013.01); *H04L 1/1822* (2013.01)
 USPC .......................................... 370/336; 370/458

(58) Field of Classification Search
 None
 See application file for complete search history.

(56) References Cited

U.S. PATENT DOCUMENTS

2009/0307554 A1* 12/2009 Marinier et al. .............. 714/748

OTHER PUBLICATIONS

3GPP, 3GPP TS 36.321 v8.3.0 MAC specification, Sep. 2008.
3GPP, 3GPP TSG-RAN2#61bis R2-081446, Mar. 2008.
3GPP, 3GPP TSG-RAN2#61bis R2-081465, Mar. 2008.
3GPP, 3GPP TSG-RAN2#61bis R2-081466, Mar. 2008.
3GPP, 3GPP TSG-RAN2#62bis R2-083480, Jun. 2008.
3GPP, 3GPP TSG-RAN2#63bis R2-083867, Aug. 2008.
3GPP, 3GPP TSG-RAN2#63bis R2-083888, Aug. 2008.
3GPP, 3GPP TSG-RAN2#63bis R2-084875, Aug. 2008.
3GPP, 3GPP TSG-RAN2#63bis R2-085025, Sep. 2008.
3GPP, 3GPP TSG-RAN2#62bis R2-083107, Jun. 2008.
3GPP, 3GPP TSG-RAN2#63bis R2-083830, Aug. 2008.
3GPP, 3GPP TSG-RAN1#55 R1-084549, Nov. 2008.
ASUSTEK: "Clarification on UE behaviour at TTI bundling configuration" 3GPP TSG-RAN WG2 #64, R2-086144, Nov. 10-14, 2008, XP050321054, Prague, Czech Republic.
ASUSTEK: "Correction and Clarification on TTI Bundling" 3GPP TSG-RAN WG2 #63bis, R2-085025, Sep. 29-Oct. 3, 2008, XP050319897, Prague, Czech Republic.
Ericsson: "Text Proposal for TTI bundling" 3GPP TSG-RAN WG2 #62, Tdoc R2-082149, update of R2-081466, May 5-9, 2008, XP050139928, Kansas City, USA.

* cited by examiner

*Primary Examiner* — Jutai Kao
(74) *Attorney, Agent, or Firm* — Winston Hsu; Scott Margo

(57) ABSTRACT

A method of improving a hybrid automatic repeat request (HARQ) procedure in the transition of transmission time interval (TTI) bundling for a MAC layer of a user equipment in a wireless communication system, the method including activating TTI bundling upon receiving a bundling activation command, and using a first number of unused HARQ processes in the first round trip time after TTI bundling is activated to continue the first number of unfinished HARQ processes before TTI bundling is activated.

12 Claims, 9 Drawing Sheets

METHOD AND APPARATUS FOR IMPROVING A HYBRID AUTOMATIC REPEAT REQUEST PROCEDURE IN THE TRANSITION OF TRANSMISSION TIME INTERVAL BUNDLING IN A WIRELESS COMMUNICATION SYSTEM

CROSS REFERENCE TO RELATED APPLICATIONS

This application claims the benefit of U.S. Provisional Application No. 61/121,191, filed on Dec. 10, 2008 and entitled "METHOD AND APPARATUS FOR IMPROVING TRANSMISSION TIME INTERVAL BUNDLING IN A WIRELESS COMMUNICATIONS SYSTEM", the contents of which are incorporated herein.

BACKGROUND OF THE INVENTION

1. Field of the Invention

The present invention relates to a method and related communication device in a wireless communication system for improving a hybrid automatic repeat request (HARQ) procedure, and more particularly, to a method and related communication device for improving an uplink HARQ procedure in the transition between transmission time interval (TTI) bundling and non-bundling.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of the E-UTRAN is given including a radio resource control layer (RRC), a packet data convergence protocol layer (PDCP), a radio link control layer (RLC), a medium access control layer (MAC), and a physical layer (PHY).

In order to improve uplink (UL) coverage of LTE at cell edge, transmission time interval (TTI) bundling is introduced for frequency division duplex (FDD). Activation or deactivation of TTI bundling is controlled by a radio resource control (RRC) command and a parameter TTI_BUNDLE_SIZE, which provides the number of TTIs of a TTI bundle, is 4. Within a TTI bundle, hybrid automatic repeat request (HARQ) retransmissions are non-adaptive and are performed without waiting for feedback of previous transmissions. A HARQ feedback, e.g. positive-acknowledgement (ACK)/negative-acknowledgement (NACK) information, for a TTI bundle is only received for the TTI corresponding to the TTI_BUNDLE_SIZE, which is the last TTI of the bundle. A retransmission of a TTI bundle is also a TTI bundle. In addition, the number of HARQ processes is decreased from 8 to 4 and the UL HARQ round trip time (RTT) after TTI bundling activation is increased from 8 to 16.

A HARQ entity at a UE maintains a number of parallel HARQ processes allowing transmissions to take place continuously while waiting for the HARQ feedback on successful or unsuccessful receptions of previous transmissions, and also carries new transmission parameters, e.g. a new data indicator (NDI) and spectral resources including a physical resource block (PRB) and a modulation and coding scheme (MCS), for each HARQ process. At a given TTI, if an UL grant is indicated for the TTI, the HARQ entity identifies a HARQ process where a transmission in the TTI should take place. Based on a physical downlink control channel (PDCCH), the HARQ entity also determines whether a retransmission is adaptive or non-adaptive and provides transmission parameters for non-adaptive retransmission. When an ACK for a HARQ process is received, the HARQ entity considers the HARQ process suspended and stops generating non-adaptive retransmission for the HARQ process.

Please refer to FIG. 1, which is a timing diagram illustrating HARQ processes when TTI bundling is activated according to the prior art. In FIG. 1, a UE receives a NACK for a bundle of HARQ process 0 from the eNB at the subframe (n+4) when the last TTI of the bundle of HARQ process 0 is the subframe n, and when the first TTI of the bundle of HARQ process 0 is the beginning of an RTT, the UE does not perform a retransmission of the HARQ process 0 until a next RTT.

However, so far the 3GPP specification has not captured the HARQ procedure for unfinished HARQ processes after TTI bundling is activated or deactivated. Therefore, the UE may have no idea for whether to continue unfinished HARQ processes after TTI bundling is activated or deactivated.

SUMMARY OF THE INVENTION

The present invention therefore provides a method and related communication device for improving a HARQ procedure in the transition of TTI bundling.

The present invention discloses a method of improving a HARQ procedure in the transition of TTI bundling for a MAC layer of a UE in a wireless communication system. The method includes activating TTI bundling upon receiving a bundling activation command, and using a first number of unused HARQ processes in the first round trip time after TTI bundling is activated to continue the first number of unfinished HARQ processes before TTI bundling is activated.

The present invention further discloses a communication device of a wireless communication system for improving uplink transmission of TTI bundling. The communication device includes means for activating TTI bundling upon receiving a bundling activation command and means for using a first number of unused HARQ processes in the first round trip time after TTI bundling is activated to continue the first number of unfinished HARQ processes before TTI bundling is activated.

The present invention further discloses a method of improving a HARQ procedure in the transition of TTI bundling for a MAC layer of a UE in a wireless communication system. The method includes deactivating TTI bundling upon receiving a bundling deactivation command, and using a first number of unused HARQ processes in the first round trip time after TTI bundling is deactivated to continue the first number of unfinished HARQ processes before TTI bundling is deactivated.

The present invention further discloses a communication device of a wireless communication system for improving uplink transmission of TTI bundling. The communication device includes means for deactivating TTI bundling upon receiving a bundling deactivation command and means for using a first number of unused HARQ processes in the first round trip time after TTI bundling is deactivated to continue the first number of unfinished HARQ processes before TTI bundling is deactivated.

The present invention further discloses a method of improving a HARQ procedure in the transition of TTI bundling for a network in a wireless communication system. The method includes changing status of TTI bundling and synchronizing with a UE connecting with the network for an uplink HARQ process when the UE uses a first number of unused HARQ processes in the first round trip time after the status of TTI bundling is changed to continue the first number of unfinished HARQ processes before the status of TTI bundling is changed.

The present invention further discloses a communication device of a wireless communication system for improving uplink transmission of TTI bundling. The communication device includes means for changing status of TTI bundling and means for synchronizing with a UE connecting with the communication device for an uplink HARQ process when the UE uses a first number of unused HARQ processes in the first round trip time after the status of TTI bundling is changed to continue the first number of unfinished HARQ processes before the status of TTI bundling is changed.

The present invention further discloses a method of improving a HARQ procedure in the transition of TTI bundling for a network in a wireless communication system. The method includes performing HARQ processes and sending a command for changing status of TTI bundling to a UE after each unfinished HARQ process reaches the maximum number of HARQ retransmissions and is flushed from a HARQ buffer.

The present invention further discloses a communication device of a wireless communication system for improving uplink transmission of TTI bundling. The communication device includes means for performing HARQ processes and means for sending a command for changing status of TTI bundling to a UE after each unfinished HARQ process reaches the maximum number of HARQ retransmissions and is flushed from a HARQ buffer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
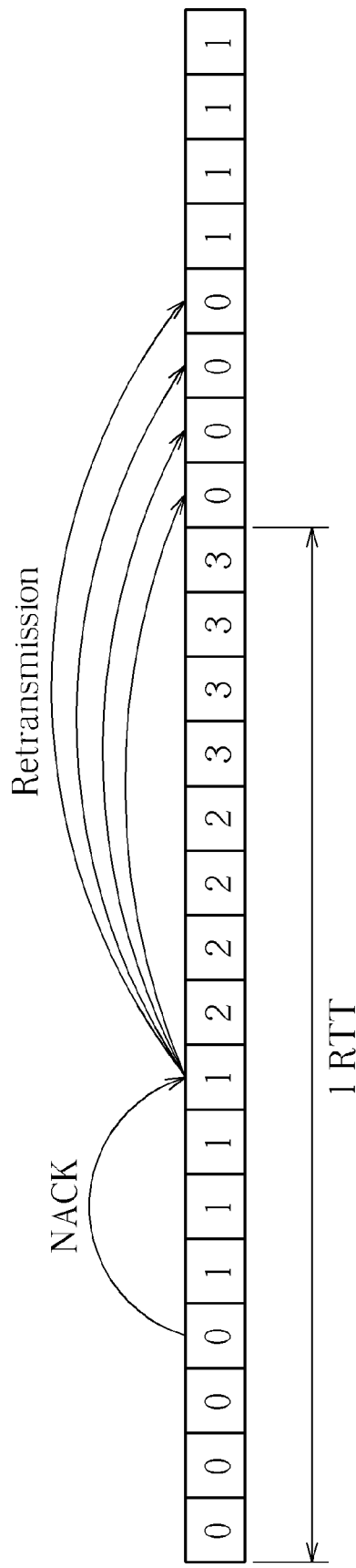
FIG. 1 is a timing diagram illustrating HARQ processes when TTI bundling is activated according to the prior art.
Figure 2:
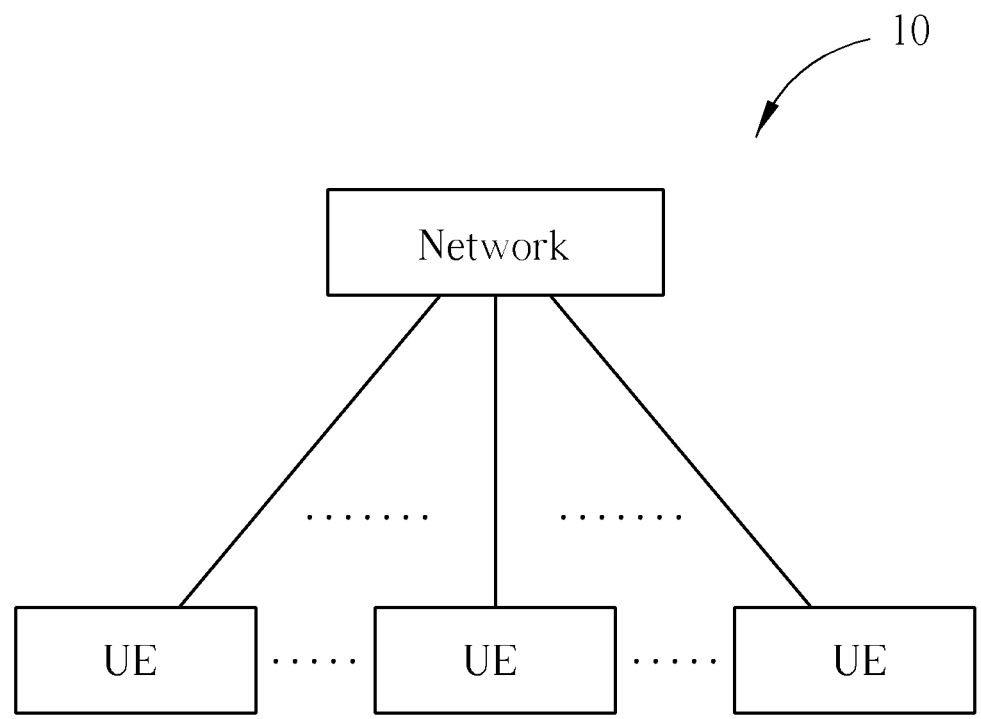
FIG. 2 is a schematic diagram of a wireless communication system.

Please refer to FIG. 2, which is a schematic diagram of a wireless communication system 10. The wireless communication system 10 can be a long-term evolution (LTE) system or other mobile communication systems, and is briefly composed of a network and a plurality of UEs, as the structure illustrated in FIG. 2. In the LTE system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 3:
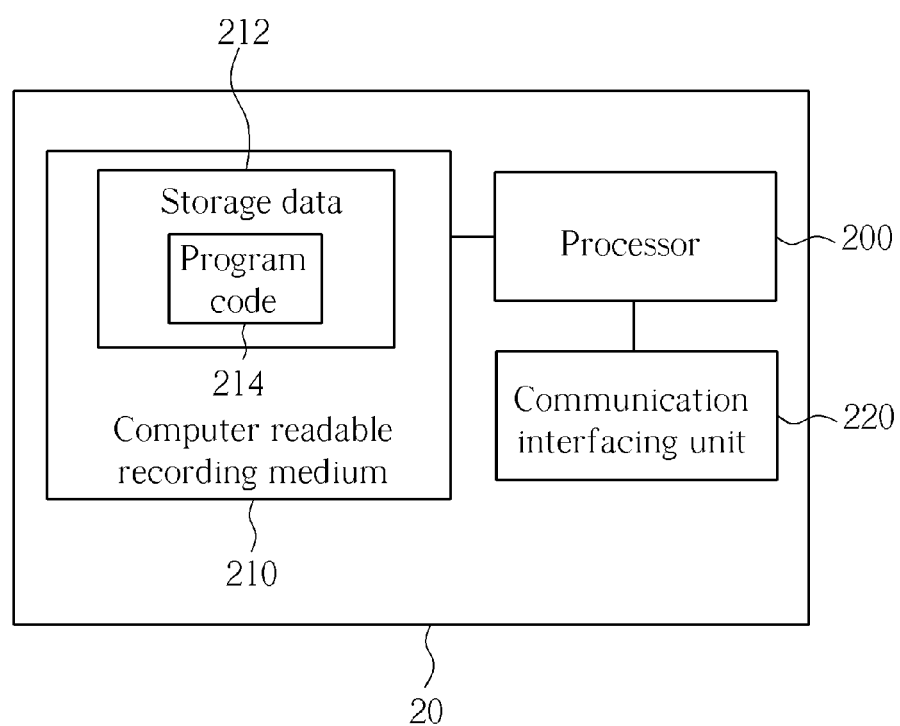
FIG. 3 is a schematic diagram of a communication device according to an example of the present invention.

Please refer to FIG. 3, which is a schematic diagram of a communication device 20 according to an example of the present invention. The communication device 20 can be the UE or the network shown in FIG. 3 and includes a processor 200, a computer readable recording medium 210, and a communication interfacing unit 220. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The communication interfacing unit 220 is coupled to the processor 200, and is preferably a radio transceiver for wirelessly communicating with the network.

Figure 4:
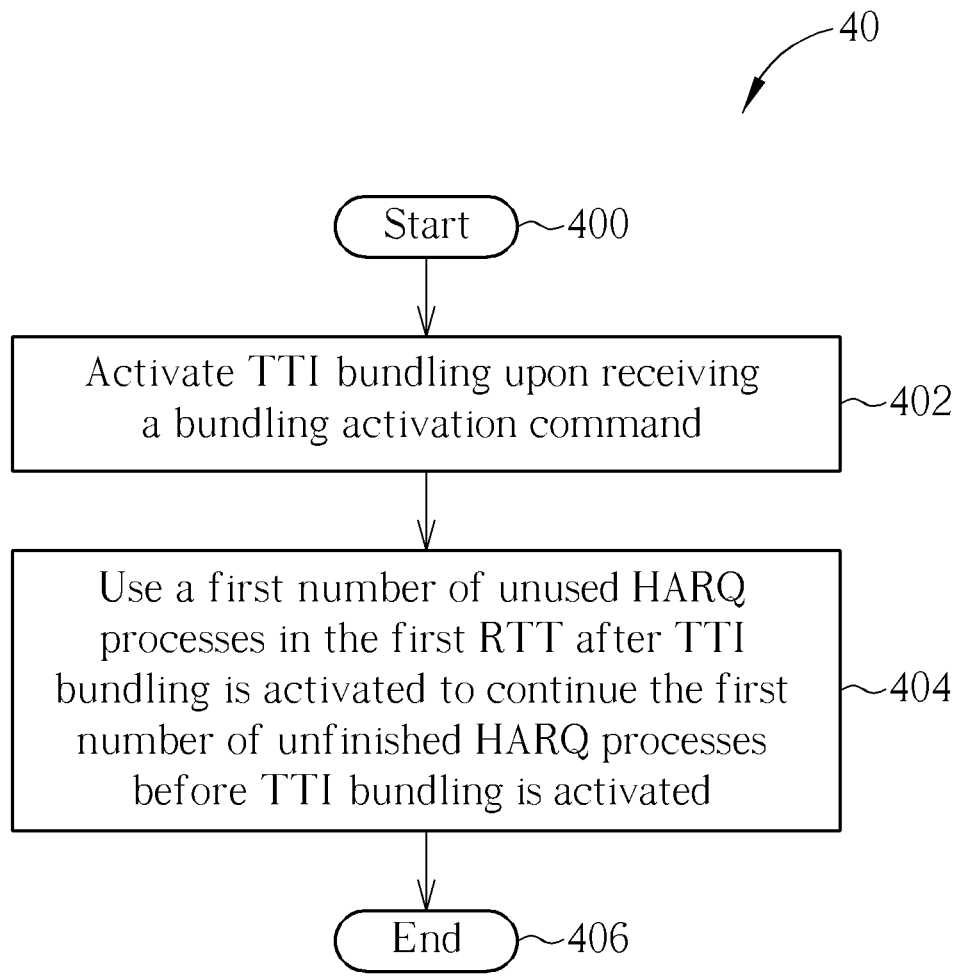
FIG. 4 is a flowchart of a process according to an example of the present invention.

From the above, the specification does not capture the hybrid automatic repeat request (HARQ) procedure yet for the unfinished HARQ processes during the transition between transmission time interval (TTI) bundling and non-bundling. Please refer to FIG. 4, which is a flowchart of a process 40 according to an example of the present invention. The process 40 is utilized for improving a HARQ procedure in the transition of TTI bundling for a MAC layer of a UE in the wireless communication system 10 and can be compiled into the program code 214. The process 40 includes the following steps:

Step 400: Start.

Step 402: Activate TTI bundling upon receiving a bundling activation command.

Step 404: Use a first number of unused HARQ processes in the first round trip time (RTT) after TTI bundling is activated to continue the first number of unfinished HARQ processes before TTI bundling is activated.

Step 406: End.

According to current specification, the number of unused HARQ processes in the first RTT after TTI bundling is activated is no more than 4. Let x denote the number of unused HARQ processes in the first HARQ RTT after TTI bundling is activated, x≤4, and y denote the number of unfinished HARQ processes before TTI bundling is activated, y≤8. Note that the first number mentioned in Step 404 implies the number of unused HARQ processes or only a part of them. All the unfinished HARQ processes may not be completed entirely after TTI bundling is activated, which depends on whether the number of unused HARQ processes in the first RTT is enough. Whether the number of unused HARQ process is enough or not, the eNB can choose to wait until the unfinished HARQ process(es) is flushed and then activates the TTI bundling by sending a bundling activation command.

The process 40, more specifically, is performed as follows. When the number of unfinished HARQ processes is smaller than or equal to the number of unused HARQ processes, y≤x, the UE uses y unused HARQ processes in the first RTT after TTI bundling is activated to continue y unfinished HARQ processes; and when the number of unfinished HARQ processes is larger than the number of unused HARQ processes, y>x, the UE uses the total x unused HARQ processes to continue earlier x unfinished HARQ processes and flushes HARQ buffers corresponding to the later (y−x), i.e. x+1, x+2, . . . y, unfinished HARQ processes or suspends the later (y−x) unfinished HARQ processes because the HARQ entity has no resource in the first RTT to continue the later (y−x) unfinished HARQ processes after the earlier x unfinished HARQ processes are performed. In addition, the unused HARQ processes are filled with the unfinished HARQ processes in a time order the same as before TTI bundling is activated. In other words, the unfinished HARQ processes are performed in an original time order in the first RTT after TTI bundling is activated.

Figure 5:
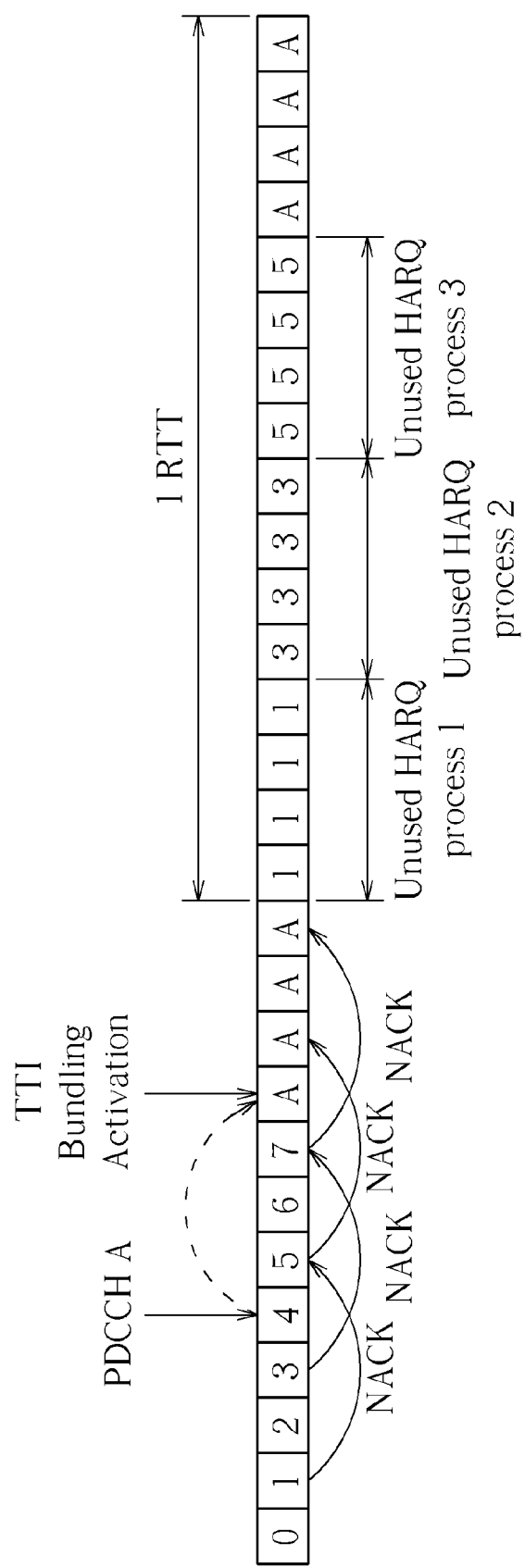
FIG. 5 is a timing diagram of HARQ processes according to the process in FIG. 4.

Please refer to FIG. 5, which is a timing diagram of HARQ processes according to the process 40, illustrating how the HARQ procedure is performed from non-bundling to bundling. In FIG. 5, there are four unfinished HARQ processes before TTI bundling is activated, denoted by 1, 3, 5, and 7, and corresponding negative-acknowledgements (NACKs) are received. After TTI bundling is activated, the first bundle of HARQ process is corresponding to a PDCCH signaling, denoted by PDCCH A, and the subsequent three HARQ processes in the first RTT are left unused. According to the process 40 in FIG. 4, the three unused HARQ processes are used for the unfinished HARQ processes 1, 3, and 5, and the HARQ buffer corresponding to the HARQ process 7 is flushed or suspended since there is no more unused resource.

Figure 6:
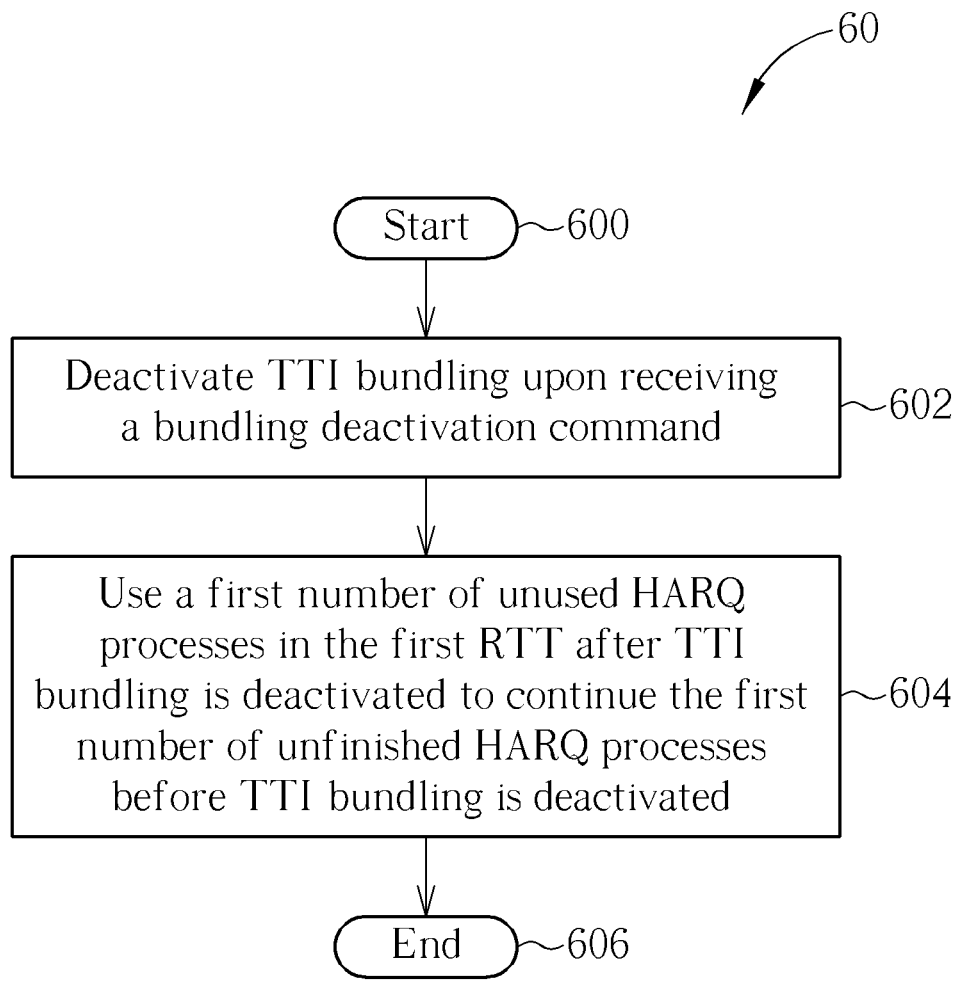
FIG. 6 is a flowchart of a process according to an example of the present invention.

The process 40 is used for the HARQ procedure in the transition from non-bundling to bundling. On the other hand, the present invention further provides a similar process used in the transition from bundling to non-bundling. Please refer to FIG. 6, which is a flowchart of a process 60 according to an example of the present invention. The process 60 is utilized for improving the HARQ procedure in the transition of TTI bundling for a MAC layer of a UE in the wireless communication system 10 and can be compiled into the program code 214. The process 60 includes the following steps:

Step 600: Start.

Step 602: Deactivate TTI bundling upon receiving a bundling deactivation command.

Step 604: Use a first number of unused HARQ processes in the first RTT after TTI bundling is deactivated to continue the first number of unfinished HARQ processes before TTI bundling is deactivated.

Step 606: End.

Let x denote the number of unused HARQ processes in the first HARQ RTT after the TTI bundling is deactivated, x≤8, and y denote a total number of unfinished HARQ processes before the TTI bundling is deactivated, y≤4. Similar to the previous process 40, the first number mentioned in Step 604 implies the number of unused HARQ processes or only a part of them, and whether all of the unfinished HARQ processes are completed depends on the number of unused HARQ processes.

When the number of unfinished HARQ processes is smaller than or equal to the number of unused HARQ processes, y≤x, the UE uses y unused HARQ processes in the first RTT after TTI bundling is deactivated to continue y unfinished HARQ processes; and when the number of unfinished HARQ processes is larger than the number of unused HARQ processes, y>x, the UE uses the total x unused HARQ processes to continue the earlier x unfinished HARQ processes and flushes HARQ buffers corresponding to the later (y−x), i.e. x+1, x+2, . . . y, unfinished HARQ processes or suspends the later (y−x) unfinished HARQ processes because the HARQ entity has no resource to continue the later (y−x) unfinished HARQ processes. Also, the unused HARQ processes are filled with the unfinished HARQ processes in a time order the same as before TTI bundling is deactivated. Whether the number of unused HARQ process is enough or not, eNB can choose to wait until the unfinished HARQ process(es) is flushed and then deactivates the TTI bundling by sending a bundling deactivation command.

Figure 7:
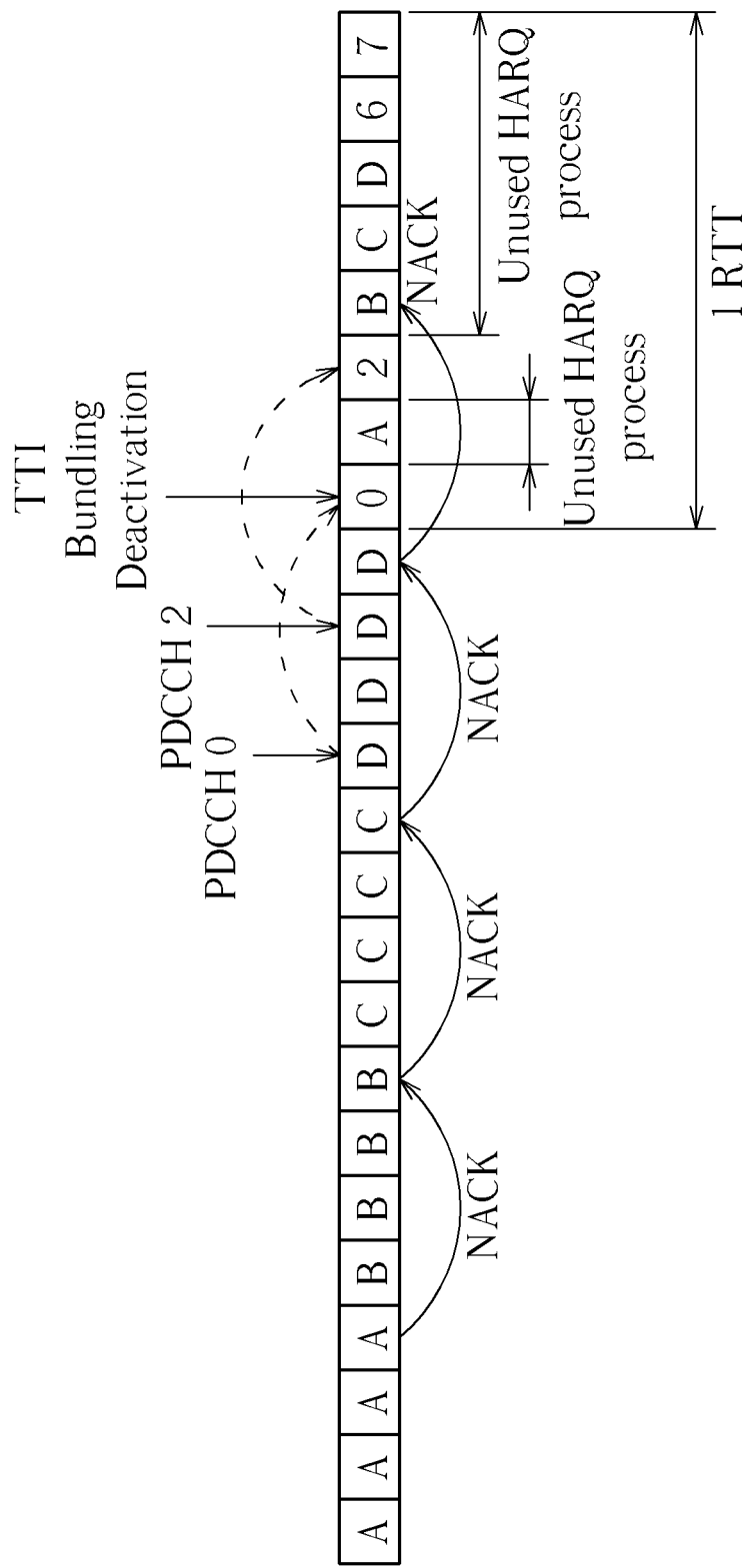
FIG. 7 is a timing diagram of HARQ processes according to the process in FIG. 6.

Please refer to FIG. 7, which is a timing diagram of HARQ processes according to the process 60, illustrating the HARQ procedure from TTI bundling to non-bundling. In FIG. 7, before TTI bundling is deactivated, there are four unfinished HARQ processes, denoted by A, B, C, and D in order, and three NACKs corresponding to the HARQ processes A, B, and C are received. A PDCCH 0 and a PDCCH 2 for adaptive transmissions are also received. After TTI bundling is deactivated, the first HARQ process is used by the PDCCH 0. The second HARQ process is unused and is first filled with the HARQ process A according to the original time order. The third HARQ process is used by the PDCCH 2. The subsequent three unused HARQ processes are used by the unfinished HARQ processes B, C, and D in the original time order.

From the above, the UE handles the HARQ procedure during the transition from the non-bundling to bundling through the process 40, and also handles the HARQ procedure during the transition from TTI bundling to non-bundling through the process 60. In the prior art, there is no further consideration for the HARQ procedure during the transition of TTI bundling. In comparison, the HARQ procedure is performed more smoothly during the transition of TTI bundling according to the examples of the present invention.

Figure 8:
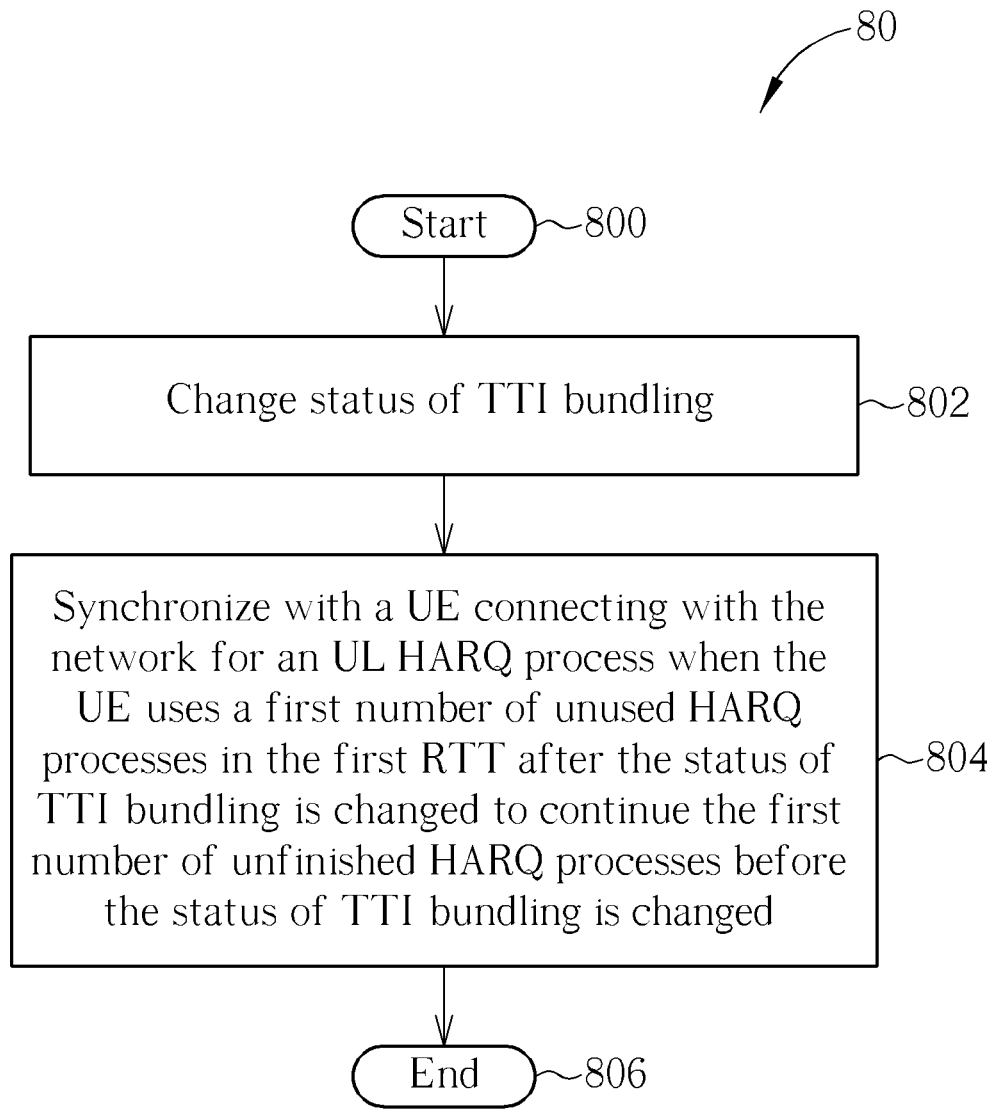
FIG. 8 is a flowchart of a process according to an example of the present invention.

Please refer to FIG. 8, which is a flowchart of a process 80 according to an example of the present invention. The process 80 is utilized for improving the HARQ procedure in the transition of TTI bundling for a network, i.e. an eNB, in the wireless communication system 10 and can be compiled into the program code 214. The process 80 includes the following steps:

Step 800: Start.

Step 802: Change status of TTI bundling.

Step 804: Synchronize with a UE connecting with the network for an UL HARQ process when the UE uses a first number of unused HARQ processes in the first RTT after the status of TTI bundling is changed to continue the first number of unfinished HARQ processes before the status of TTI bundling is changed.

Step 806: End.

In a word, the process 80 is used to synchronize with a UE which connects with the eNB for an UL HARQ process when the UE performs the process 40 or the process 60. Through the process 80, the eNB is ready to receive UL transport blocks of unfinished HARQ processes during the transition from non-bundling to TTI bundling and the transition from TTI bundling to non-bundling. Therefore, the received HARQ entity at the eNB can associate transport blocks to the right HARQ processes. Also, when the unfinished HARQ process is discontinued due to the lack of unused HARQ process after the status of TTI bundling is changed, the eNB follows the same action as the UE does, either flushing the HARQ buffers corresponding to the unfinished HARQ processes except an earlier part of the unfinished HARQ processes that are finished by all of the unused HARQ processes, or suspending the unfinished HARQ processes.

Figure 9:
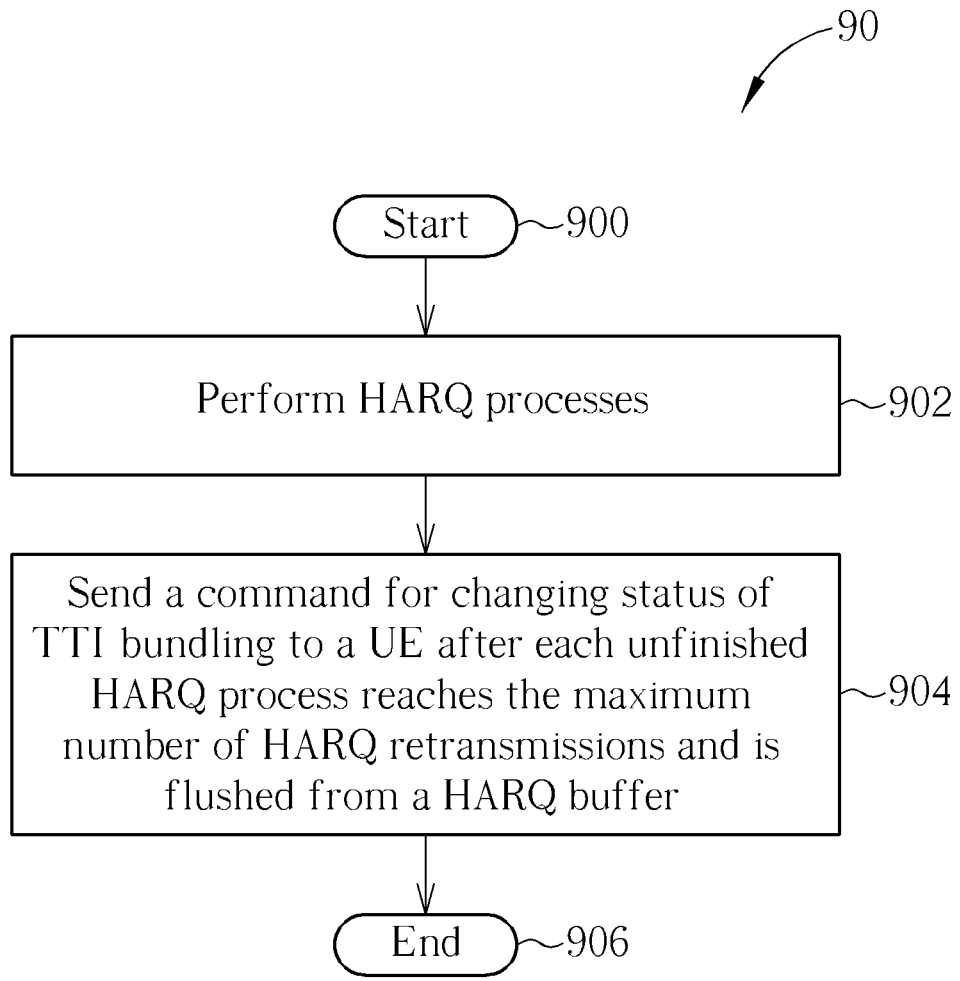
FIG. 9 is a flowchart of a process according to an example of the present invention.

Besides, the eNB has another way to avoid handling HARQ procedure during TTI bundling transition. Please refer to FIG. 9, which is a flowchart of a process 90 according to an example of the present invention. The process 90 is utilized for improving the HARQ procedure in the transition of TTI bundling for a network, i.e. the eNB, in the wireless communication system 10 and can be compiled into the program code 214. The process 90 includes the following steps:

Step 900: Start.
Step 902: Perform HARQ processes.
Step 904: Send a command for changing status of TTI bundling to a UE after each unfinished HARQ process reaches the maximum number of HARQ retransmissions and is flushed from a HARQ buffer.
Step 906: End.

In the process 90, the eNB simply performs HARQ processes until each unfinished HARQ process reaches the maximum number of HARQ retransmissions and therefore is flushed from a HARQ buffer, and then sends a command for changing status of TTI bundling, which is from TTI bundling to non-bundling or from non-bundling to TTI bundling, to a UE. In other words, when the eNB considers changing status of TTI bundling when seeing increasing retransmissions in UL, the eNB can wait until the unfinished HARQ process(es) to reach the maximum retransmission number and are flushed from the HARQ buffer, then send the bundling activation/deactivation command. Therefore, there is no more problem of unfinished HARQ processes after the status of TTI bundling is changed.

Please note that the steps in the processes 40, 60, 80, and 90 and detailed steps related to each process can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (SIP), or computer on module (COM).

In conclusion, the present invention fulfills the UL HARQ procedure for the UE side and the eNB side. Therefore, the UL HARQ procedure is smoothly performed during the transition of TTI bundling.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving a hybrid automatic repeat request, abbreviated to HARQ, procedure in the transition of transmission time interval, abbreviated to TTI, bundling for a medium access control layer of a user equipment in a wireless communication system, the method comprising:
   activating TTI bundling upon receiving a bundling activation command; and
   using a first number of unused HARQ processes in the first round trip time (RTT) after TTI bundling is activated to continue, in a bundling way, the first number of unfinished HARQ processes which have not been finished before TTI bundling is activated;
   wherein the first number is equivalent to the total number of unfinished HARQ processes when the total number of unfinished HARQ processes is smaller than or equal to the total number of unused HARQ processes which are available in the first RTT after TTI bundling is activated, and the first number is equivalent to the total number of unused HARQ processes which are available in the first RTT after TTI bundling is activated when the total number of unfinished HARQ processes is larger than the total number of unused HARQ processes which are available in the first RTT after TTI bundling is activated.

2. The method of claim 1 further comprising:
   flushing HARQ buffers corresponding to a second number of unfinished HARQ processes which have not been finished before TTI bundling is activated and also have not been finished in the first RTT after TTI bundling is activated.

3. The method of claim 1, wherein the first number of unused HARQ processes are filled with the first number of unfinished HARQ processes in a time order the same as before TTI bundling is activated.

4. A communication device of a wireless communication system for improving a hybrid automatic repeat request, abbreviated to HARQ, procedure in the transition of transmission time interval, abbreviated to TTI, bundling, the communication device comprising:
   means for activating TTI bundling upon receiving a bundling activation command; and
   means for using a first number of unused HARQ processes in the first round trip time (RTT) after TTI bundling is activated to continue, in a bundling way, the first number of unfinished HARQ processes which have not been finished before TTI bundling is activated;
   wherein the first number is equivalent to the total number of unfinished HARQ processes when the total number of unfinished HARQ processes is smaller than or equal to the total number of unused HARQ processes which are available in the first RTT after TTI bundling is activated, and the first number is equivalent to the total number of unused HARQ processes which are available in the first RTT after TTI bundling is activated when the total number of unfinished HARQ processes is larger than the total number of unused HARQ processes which are available in the first RTT after TTI bundling is activated.

5. The communication device of claim 4 further comprising:
   means for flushing HARQ buffers corresponding to a second number of unfinished HARQ processes which have not been finished before TTI bundling is activated and also have not been finished in the first RTT after TTI bundling is activated.

6. The communication device of claim 4, wherein the first number of unused HARQ processes are filled with the first number of unfinished HARQ processes in a time order the same as before TTI bundling is activated.

7. A method of improving a hybrid automatic repeat request, abbreviated to HARQ, procedure in the transition of transmission time interval, abbreviated to TTI, bundling for a medium access control layer of a user equipment in a wireless communication system, the method comprising:
   deactivating TTI bundling upon receiving a bundling deactivation command; and
   using a first number of unused HARQ processes in the first round trip time (RTT) after TTI bundling is deactivated to continue, in a non-bundling way, the first number of unfinished HARQ processes which have not been finished before TTI bundling is deactivated;
   wherein the first number is equivalent to the total number of unfinished HARQ processes when the total number of unfinished HARQ processes is smaller than or equal to the total number of unused HARQ processes which are available in the first RTT after TTI bundling is deactivated, and the first number is equivalent to the total number of unused HARQ processes which are available in the first RTT after TTI bundling is deactivated when the total number of unfinished HARQ processes is larger than the total number of unused HARQ processes which are available in the first RTT after TTI bundling is deactivated.

8. The method of claim 7 further comprising:
flushing HARQ buffers corresponding to a second number of unfinished HARQ processes which have not been finished before TTI bundling is deactivated and also have not been finished in the first RTT after TTI bundling is deactivated.

9. The method of claim 7, wherein the first number of unused HARQ processes are filled with the first number of unfinished HARQ processes in a time order the same as before TTI bundling is deactivated.

10. A communication device of a wireless communication system for improving a hybrid automatic repeat request, abbreviated to HARQ, procedure in the transition of transmission time interval, abbreviated to TTI, bundling, the communication device comprising:
means for deactivating TTI bundling upon receiving a bundling deactivation command; and
means for using a first number of unused HARQ processes in the first round trip time (RTT) after TTI bundling is deactivated to continue, in a non-bundling way, the first number of unfinished HARQ processes which have not been finished before TTI bundling is deactivated;
wherein the first number is equivalent to the total number of unfinished HARQ processes when the total number of unfinished HARQ processes is smaller than or equal to the total number of unused HARQ processes which are available in the first RTT after TTI bundling is deactivated, and the first number is equivalent to the total number of unused HARQ processes which are available in the first RTT after TTI bundling is deactivated when the total number of unfinished HARQ processes is larger than the number of unused HARQ processes which are available in the first RTT after TTI bundling is deactivated.

11. The communication device of claim 10 further comprising:
means for flushing HARQ buffers corresponding to a second number of unfinished HARQ processes which have not been finished before TTI bundling is deactivated and also have not been finished in the first RTT after TTI bundling is deactivated.

12. The communication device of claim 10, wherein the first number of unused HARQ processes are filled with the first number of unfinished HARQ processes in a time order the same as before TTI bundling is deactivated.

* * * * *